Feb. 2, 1943.  C. R. BUSCH  2,310,195
BRAKE RIGGING AND/OR RAILWAY CAR TRUCK
Filed May 15, 1941  4 Sheets-Sheet 1
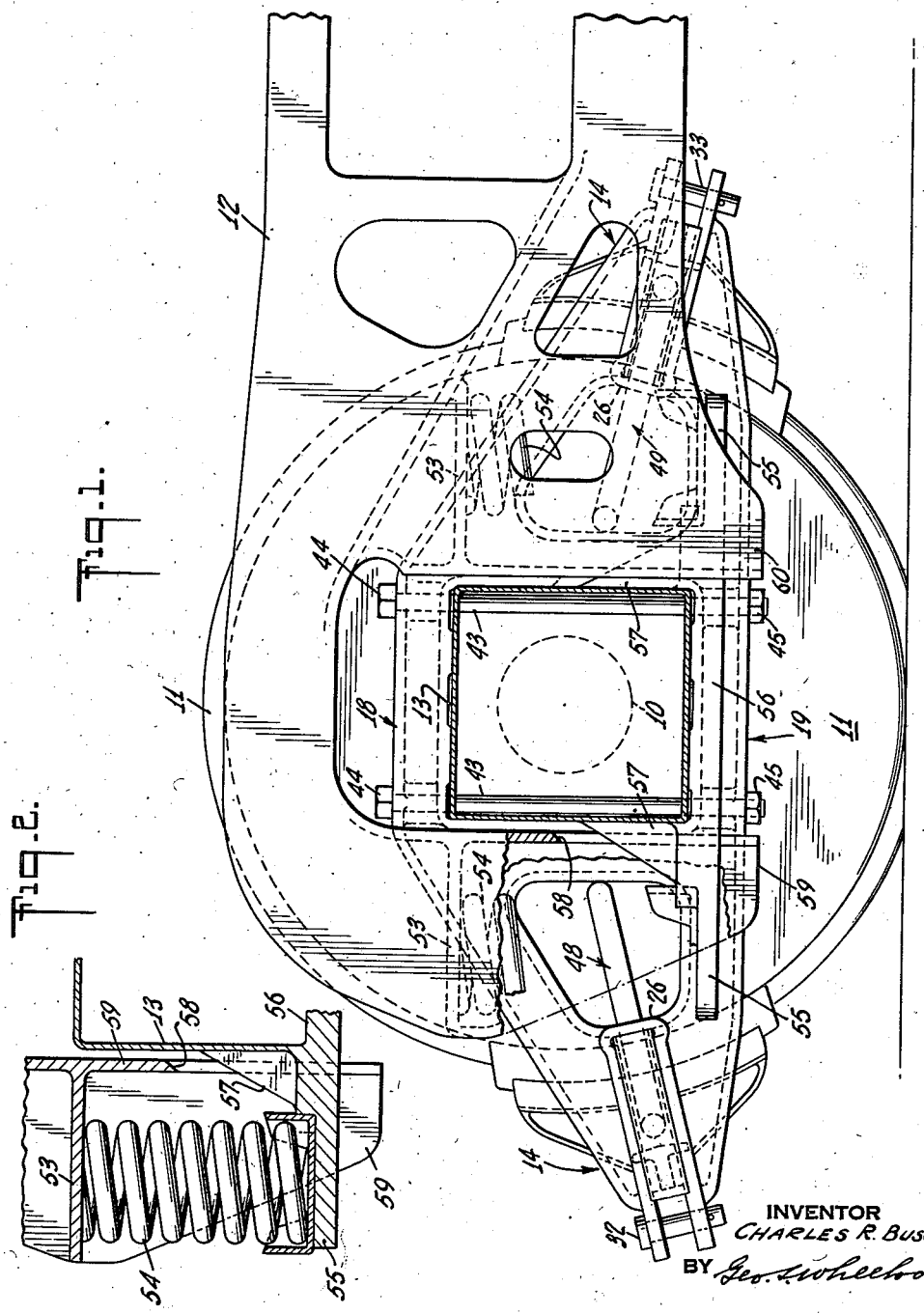
INVENTOR
CHARLES R. BUSCH.
BY
ATTORNEY

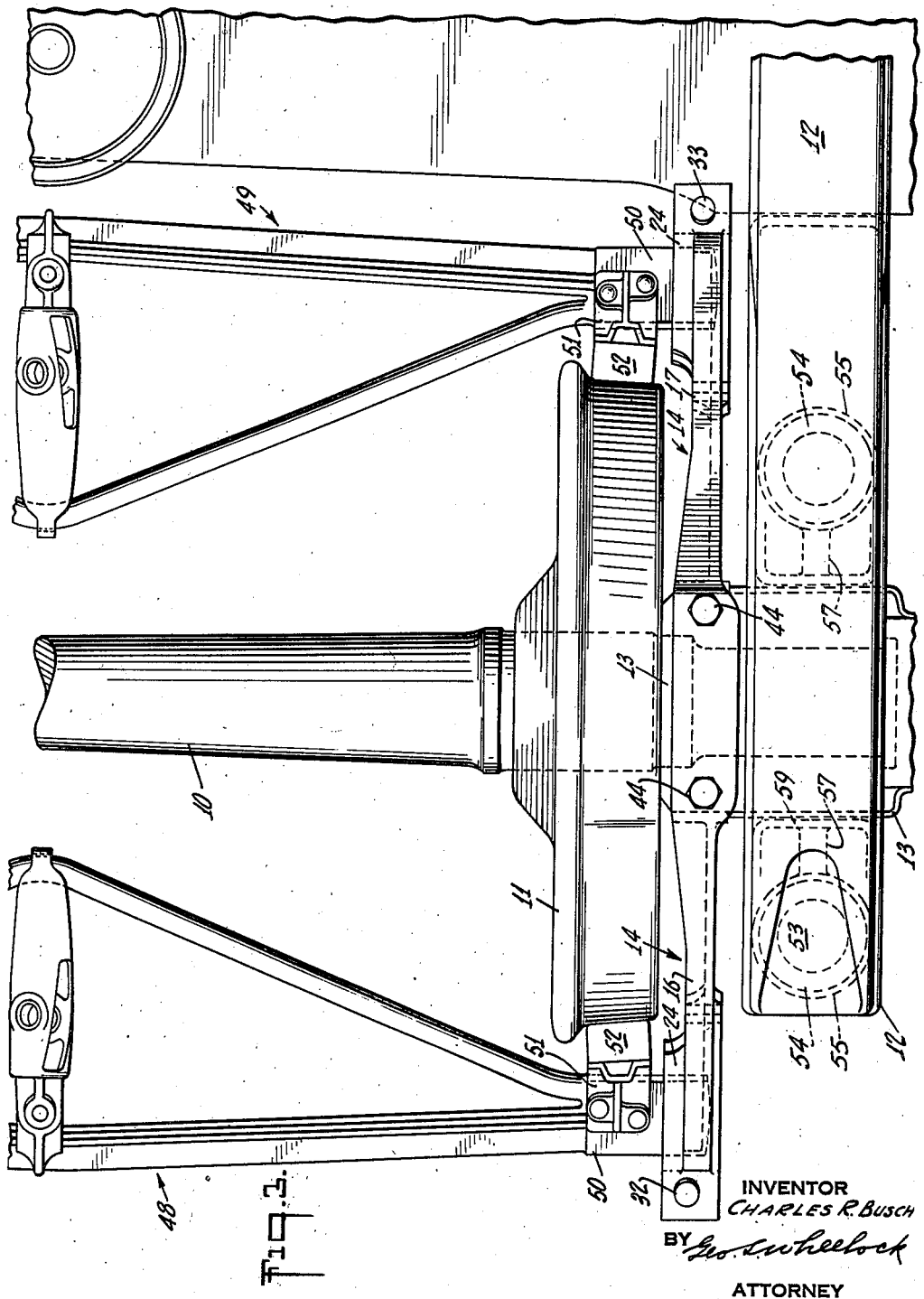

Feb. 2, 1943.         C. R. BUSCH         2,310,195
BRAKE RIGGING AND/OR RAILWAY CAR TRUCK
Filed May 15, 1941         4 Sheets-Sheet 3
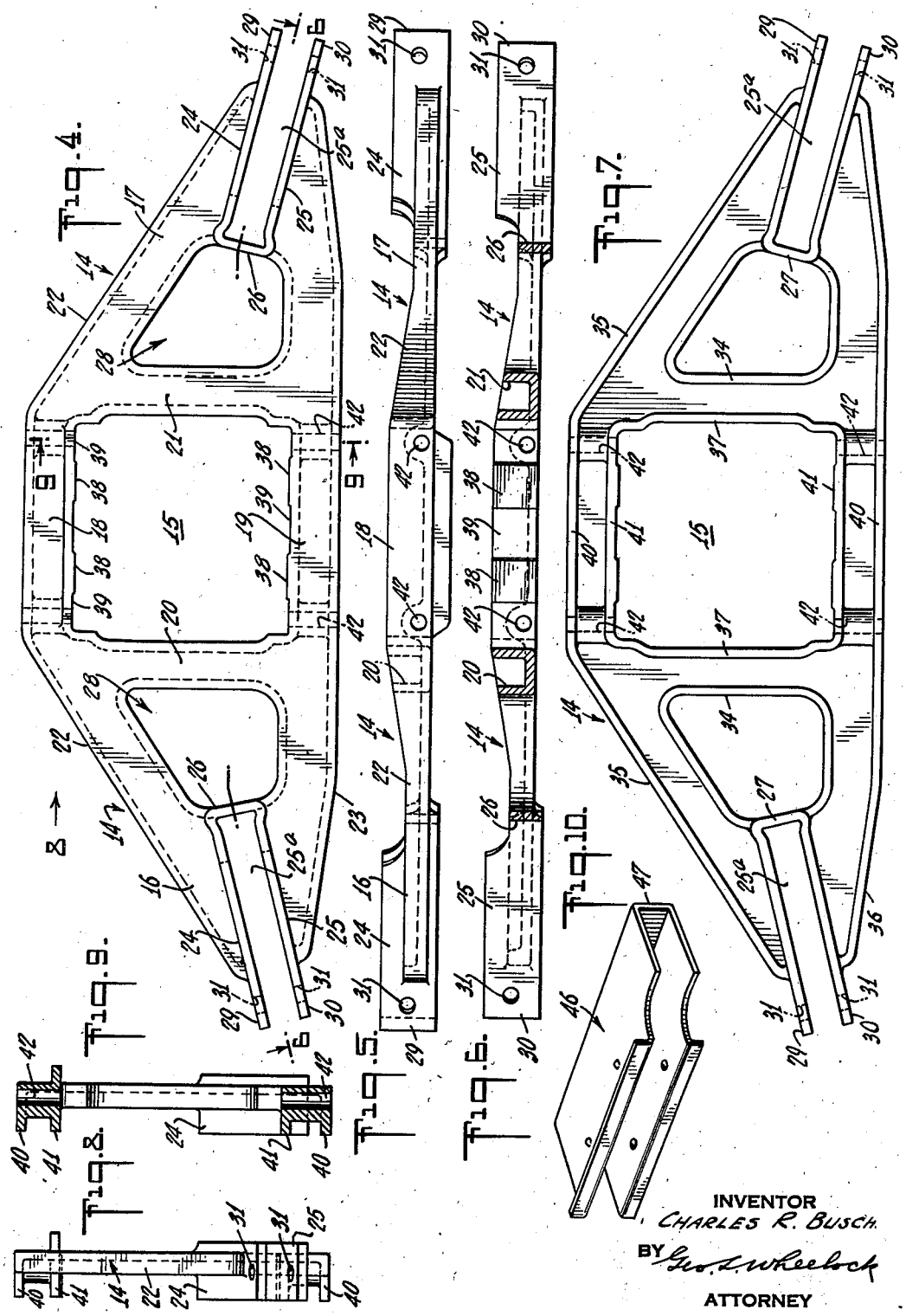
INVENTOR
CHARLES R. BUSCH
BY Geo. L. Wheelock
ATTORNEY Feb. 2, 1943.   C. R. BUSCH   2,310,195
BRAKE RIGGING AND/OR RAILWAY CAR TRUCK
Filed May 15, 1941   4 Sheets-Sheet 4

INVENTOR
CHARLES R. BUSCH.
BY
ATTORNEY

Patented Feb. 2, 1943

2,310,195

UNITED STATES PATENT OFFICE 2,310,195

BRAKE RIGGING AND/OR RAILWAY CAR TRUCK

Charles R. Busch, Orange, N. J.

Application May 15, 1941, Serial No. 393,583

28 Claims. (Cl. 188—212)

This invention relates to brake rigging and/or to railway car trucks, more especially, but not necessarily, adapted for high-speed service, and to a type of truck wherein the spring-suspension for the side frames is located at the separate journal boxes themselves, or at the same in combination with the usual spring-suspension of the car body, by means of a bolster guided in the ordinary truck side frames. In such types the truck side frames are mounted on cushioning springs and move vertically within the limits of movements of the springs, which movements range approximately from one and one-half inches to four inches, depending upon the type and construction of the springs used, thus making it unwise to support the brake or brake rigging from the side frames of such type of trucks.

Recognizing the difficulties encountered in the above connection, it is proposed under the present invention to support the brake rigging from the journal boxes of the truck, each of which boxes is definitely fixed or static with relation to the axle or wheel journals, each side frame of the truck preferably to have its spring-suspension such that its up and down movements will not in the least affect the position of a brake beam relative to the axis of an adjacent car wheel. It is proposed hereunder to support the brake and maintain it in operative position according to the principles disclosed and claimed in my prior patents, with the important difference that instead of supporting the brake from the side frames, the same is suspended from the static journal boxes. The stationary means for supporting the brake can be obtained by journal boxes located either inboard or outboard of the car wheels, and the present invention is applicable to a railway car having two, four, six, or eight wheels per truck, for either inside- or outside-located brakes or a combination of both.

In connection with the improvements covered by the present invention, reference may be had to my copending application Ser. No. 209,679, filed May 24, 1938, now Patent No. 2,269,618, Jan. 13, 1942, which relates to car trucks or brake beams of clasp type, to which type the present invention is more particularly applicable. However, in some embodiments, as in my Patent No. 2,170,112, dated August 22, 1939, the present invention may be adapted to the type of brake there disclosed.

Contemporaneously herewith there have been filed certain applications which disclose improvements in car trucks more or less included in the instant application.

A more specific object of the present invention is to provide a brake-supporting frame or structure, preferably constructed as a unit but not necessarily so, and, while the said frame is supported in a definite position in the car-truck independently of the side frames thereof, the said frame or structure preferably provides brake-beam guides at opposite sides of a journal box, said guides preferably extending outwardly and inclined downwardly with respect to the box, so that the planes in which the guides extend intersect within the journal box at a point coinciding with the axis of the adjacent wheel. In some adaptations of this invention, one guide-means may be employed. When brake beams supported by guides statically fixed upon opposite sides of the journal box are operated so as to apply the brake-shoes to opposite portions of the tread of such adjacent wheel, the brake beams will always operate in given planes which are substantially fixed with relation to the track, that is, they do not move upwardly or downwardly except to the very slight degree which may be permitted by the opposed walls of the guide itself to avoid binding a beam in its guide. This movement is due to the application of the brake and the release thereof possibly causing a very slight rocking of a beam.

With the preceding and other objects in view, the present invention consists of certain features of construction and combinations of parts to be hereinafter described and then claimed with reference to the accompanying drawings illustrating two embodiments of the invention, and in which—

Fig. 1 is a sectional side elevation of one wheel-and-axle assembly, brake beams and a portion of a truck side frame, all sufficient to disclose the present improvements as arranged outboard of the wheel, parts being shown in broken lines;

Fig. 2 is a detail sectional elevation of parts showing how the truck side frame is suspended;

Fig. 3 is a top plan of the parts shown in Fig. 1, illustrating the general construction or about one-half the width of the truck and parts being in broken lines;

Fig. 4 is a side elevation of the brake beam supporting unit or frame, parts shown in broken lines;

Fig. 5 is a top plane of Fig. 4;

Fig. 6 is a longitudinal section on the line 6—6, Fig. 4;

Fig. 7 is a side elevation of the frame shown in Fig. 4 as viewed from its opposite side;

Fig. 8 is an end elevation of Fig. 4 as viewed in the direction of the arrow 8;

Fig. 9 is a transverse section of Fig. 4 on line 9—9;

Fig. 10 is a perspective view of a wear-resisting lining;

Figure 11:
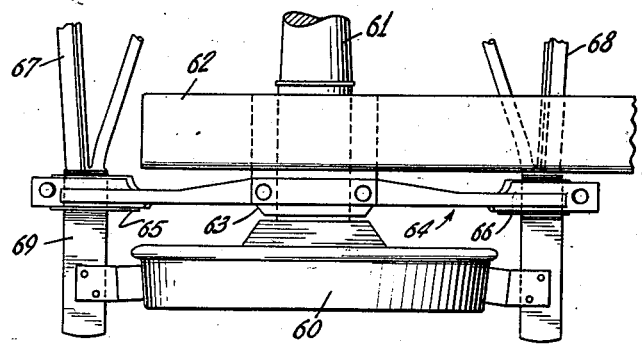
Fig. 11 is a plan showing the invention applied inboard of the wheel.

Referring to Figs. 1 and 3, the axle 10 and car wheel 11 constitute a wheel-and-axle assembly, and it will be understood that there are similar assemblies, depending upon the number of wheels used on the truck. A truck side frame 12 is illustrated, which may have an up and down movement which is in excess of that allowed where the side frames directly support the brake. Journal-box 13 may be of any well-known construction for journaling the axle 10 therein. A brake-supporting frame 14 or structure is provided, which is more particularly illustrated in Figs. 4–9 inclusive. Preferably, this frame 14 is of a truss or spider type, as will be explained. Some of the features of the present invention so far as the brake-supporting member 14 is concerned are disclosed in my application filed contemporaneously herewith, Ser. No. 393,581. Preferably, the frame 14 is composed of one steel casting or a forging, but it may be built up of permanently-united sections or plates, or it may be composed of two such brake-supporting members as disclosed in said application, when supported at opposite sides of the journal-box.

In Figs. 4 and 7 there is shown a large central opening 15 in the frame 14, formed by a sort of closed loop, as later described, which opening, as shown in Figs. 1 and 3, has dimensions just sufficiently greater than the transverse and vertical dimensions of the journal-box 13 to permit the frame 14 to have a snug fit upon the journal-box. Bracket-members 16, 17 are formed by the end-portions of the frame 14, and are connected respectively at top and bottom by horizontal box-engaging members 18, 19, these members 18, 19 constituting the top and bottom of the middle portion of the frame 14.

Adjacent portions of the bracket-members 16, 17 are formed respectively by pillars 20, 21, which connect converging top and bottom edge-defining portions 22, 23 of the bracket-members 16, 17. These pillars and the horizontal members 18, 19 form a closed loop to fit over a journal box.

As more clearly shown in Figs. 4 and 7, each of the bracket-members 16, 17 is formed with opposing flat face-portions 24, 25, which are widened away from opposite sides thereof to form reinforcing flanges. These flat portions 24, 25 provide beam guides at opposite ends of the frame 14, and they define slots 25a between them which open outwardly at both sides of the frame, and, as shown, preferably open at the opposite ends of frame 14, so that it may be said that each end of the frame is provided with open jaws. The opposite edges of the flange-portions 24, 25 are connected at their inner ends by transverse ribs 26, which define portions of the outermost edges of the openings 28 formed in each bracket-member 16, 17. It will be seen, therefore, that the flange-like flat portions 24, 25 and the transverse ribs 26, strongly reinforce the opposite guiding ends of the frame 14, and that the portions 24, 25 provide proper guides for obtaining a straight in and out movement of brake beams.

Flat guide-portions 24, 25 are preferably continued beyond the ends of the body of the frame 14 in the form of opposed lips or ears 29, 30, which are provided with holes 31, shown in Figs. 1 and 3 as receiving movable or removable stop-pins 32, 33, which prevent the brake beams from falling to the track.

Again referring to Figs. 4–9 inclusive, there is formed on one side of the frame or structure 14 reinforcing ribs 34, one of each of the ribs bordering one of the openings 28 in each end of the frame. At the same side of the frame 14 there are provided reinforcing ribs 35, 36 at the outer edges of the bracket-portions 22, 23. Also, there is provided a rib 37 at the edge of each pillar 20, 21, which pillars are at opposite sides of the opening 15. All of these ribs are desirable in order properly to reinforce the frame 14, and it will be seen that each of the pillars is doubly reinforced by ribs 34 and 37, one at each edge thereof.

As seen more clearly in Figs. 4, 6 and 7, the horizontal connecting or box-engaging members 18, 19 are each provided with raised portions 38, which are separated by spaces 39 between the portions 38 and between the latter and the ends of the pillars 20, 21. Each of the members 18 and 19 is reinforced by longitudinal flanges or ribs 40, 41, shown also in Figs. 8 and 9. Bolt-holes 42 are formed in each of the members 18, 19, and the holes in the two members are vertically aligned with each other.

Now referring to Figs. 1 and 3, it will be seen how the frame or unit 14 is received on the journal box 13. The mounting of the frame or unit in its desired static position is accomplished by locating the box in the opening 15, in which it is received with a preferably snug fit against the adjoining surfaces of the frame, allowance for the non-parallelism or inequalities of the opposed surfaces being provided by the raised portions 38. It will be noticed that the opening 15 is formed by the pillars 20, 21 and the horizontal connecting portions 18 and 19 at the top and bottom of the frame or structure, so that these parts of the frame form a sort of closed loop, which is inserted over the journal-box. The frame is shifted along the box until the holes 42 of the frame are in registration with holes which had been previously formed in the adjacent walls of the box or formed after the frame is in the desired position. It will be seen that the adjacent edges of the pillars 20, 21 also have laterally raised portions at top and bottom which are adapted to make for a more easy and firm fitting of the frame on the box.

After the frame is thus set in the desired position, bolts 43 are passed through the registering holes in the frame 14 and the journal-box 13, preferably with their heads 44 seated upon the upper horizontal member 18, and their lower ends extending sufficiently below the other horizontal member 19 so that nuts 45 may be screwed onto the threaded ends of the bolts and tightened against said member 19.

The brake-beam supporting-frame or unit 14 will now be fixed in a stationary position relative to the adjacent wheel axis, and is shown as located at the outboard side of the wheel 11 so as to be between said wheel and the spring-supported side frame 12. In its static position, the frame or brake-beam supporting unit 14 is held in a position parallel with the adjacent wheel so that the opposite ends thereof extend beyond opposite sides of the tread of the wheel.

Referring to Fig. 10, there is illustrated a wear-resisting lining 46, having a back wall 47, and which is formed from spring-steel or other very hard metal adapted to protect the walls of each slot 25a against wear when properly mounted therein. Such lining is disclosed in one or more of my prior patents, such as No. 2,170,123, but in the instant connection there is the difference that the back wall 47 is alone adapted to constitute a back wall for each slot 25a.

Two brake-beams 48, 49 are illustrated in Figs. 1 and 3, and the same may be of any desired construction consistent with adapting them for guidance upon a frame or unit 14 at each side of a car truck. One of these beams is shown as mounted at one end-portion 50 in one of the guiding-slots 25a, while the other one is shown as mounted at a corresponding end-portion 50 in the other of said slots. It is to be understood that as only portions of each beam are shown, the omitted remaining portions at the opposite side of the truck will be constructed similarly and be guided similarly. Preferably, the end or terminal portion 50 of each beam is flat in the plane of its movement, for proper guidance in the slot or guide therefor. Each terminal supports a brake-head 51 of suitable construction, upon which is mounted the shoe 52.

As the guide-slots 25a at the ends of the frame or unit 14 are inclined downwardly with respect to the axle, the operation of the brake-beams will move them in planes which converge and intersect within the journal box, and the point of intersection preferably coincides with the axis of the adjacent wheel. It is preferred that the degree of inclination to the horizontal be at an angle of 12°–14°, as this has been found desirable in the practice of guiding a beam to apply the brake.

In Figs. 1, 2, 3 there is shown the preferred manner of supporting the side-frame 12 for obtaining the required up and down travel thereof, as is now desirable in high-speed trucks. The pedestal legs of the side frame, which straddles the box 13, are provided with upper spring-seats 53, one at each side of the journal box, and against these seats are positioned the upper ends of cushioning-springs 54, which, in turn, are seated at their lower ends on seats 55, one at each projecting end of a cross-piece or member 56, which is preferably welded, riveted or otherwise permanently united with the bottom of the journal box 13. In the construction shown, the side-frame 12 is outboard of the wheel and the brake-supporting frame or unit 14 is between the side frame and the wheel, so that the cross-piece or member 56 extends in a direction substantially parallel with the frame or unit 14.

Reinforcing or bracing webs 57 are preferably formed integrally with the opposite walls of the box 13, and with the cross-member 56, so as to assure a strong support for the springs 54 and to strongly resist the down-thrust of the side frame. One or more of these fins or reinforcing webs 57 may be provided at each side of the journal box, as the conditions of construction and operation of the involved parts may permit. Vertical slots 58 are formed in the adjacent walls of the legs 59, 60 of the side-frame pedestal, and these slots receive the fins or webs 57, the lengths of the slots being sufficient to permit the extreme up-and-down travel of the side frame.

Figure 12:
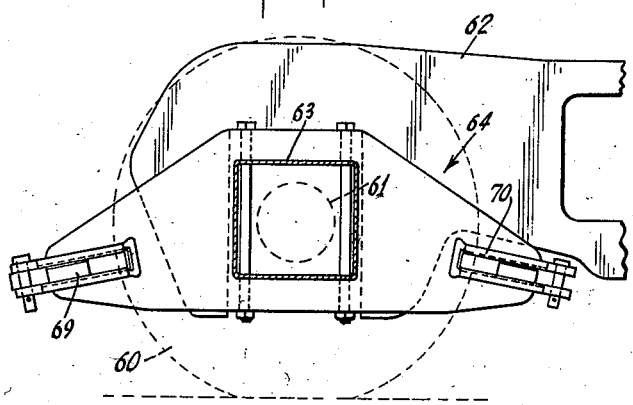
Fig. 12 is a side elevation thereof.

In Figs. 11 and 12 the present invention is shown as applied in an inboard location, that is to say, inboard of wheel 60 carried by axle 61. The side frame 62 is likewise inboard of the wheel, and suitably suspended by springs upon the journal box 63, which is likewise inboard of the wheel. The frame or unit 64 is provided at opposite ends with brake-beam guides 65, 66 similar to the guides previously described. This frame or unit 64 is fixed in a stationary position on the journal box in similar manner to that previously described and is similarly constructed. No further description in these connections appears to be necessary.

However, this particular embodiment of the invention makes use of certain improvements in brake beams and parts associated therewith which form the basis of a copending application and will be described briefly. There are shown two brake beams 67, 68, each provided with an elongated flat end-portion 69, which is of greater length than the beam-end 50 before described, it having a length sufficient to support a brake beam and shoe in braking position with respect to the wheel 60 and yet be able to guide the beam inboard of the wheel. In this embodiment the extended guiding ends 69 of the beams pass entirely through and beyond the slots of the guides 65, 66, but instead of making use of the wear-resisting lining 46 previously described, a somewhat similar lining 70 is employed. This lining 70 resides preferably in a long strip of spring-steel, which is suitably bent at the middle to provide two long legs, and which, when inserted in the guide-slot, protect the upper and lower surfaces of the guide against wear. Each brake beam 67, 68 is preferably provided with a wear covering or wear-plates applied to that part of each extended end 69 which is within the guide-slot, all as more particularly described in the copending application last mentioned.

A brake beam such as shown in Figs. 11 and 12 is adapted to be supported and guided whether or not the guides are located outboard or inboard of the wheels to which the braking pressure of the shoes on such beam is applied.

To those skilled in the art it will be obvious that different modifications of the present invention may be resorted to and still be within the scope of the appended claims.

What I claim as new is:

1. Brake-supporting means for a railway truck, comprising a rigid member adapted to be supported independently of a truck side frame, means for supporting the member on a four-walled journal box of such truck in a stable position, such means including elements for solidly bearing on the four walls of the box, and a brake-beam guide on the member and extending for a length at least equivalent to the extent of travel of the beam.

2. Brake-supporting means for a railway truck, comprising a rigid member adapted to be supported independently of a truck side frame, means for supporting the member on a journal box of such truck in a stable position, such means including elements to be completely surrounding and firmly bearing on the box, and a brake-beam guide on the member and extending for a length at least equivalent to the extent of travel of the beam.

3. Brake-supporting means for a railway truck, comprising a rigid member adapted to extend between a car wheel and a truck side frame, a closed loop independent of the side frame for fixing the member in a stable position in such location, and a brake-beam guide on such member extending away from such independent loop at a downward inclination.

4. Brake-supporting means for a railway truck, comprising a rigid member adapted to be supported independently of a truck side frame, a closed loop for embracing and supporting the member on a journal box of such truck in a stable position, said loop adapted to snugly engage the box, and a brake-beam guide on the member and extending for a length at least equivalent to the extent of travel of the beam.

5. Brake-supporting means for a railway truck, comprising a rigid member adapted to extend between a car wheel and a truck side frame, supporting means for the member including spaced horizontal elements and spaced vertical elements connected together and adapted to surround a journal box of such truck and to be rigidly secured thereto, and a brake-beam guide on the member and extending for a length equivalent to the extent of travel of the beam; said horizontal elements extending in substantially parallel planes, and the guide extending downwardly at an angle thereto.

6. In a railway car truck, the combination of a journal box and a brake-beam supporting-member having a closed loop, the interior dimensions of the loop being approximately the same as the outer dimensions of the box, and snugly embracing the box and stably supporting it on the box.

7. In a railway car truck, the combination of a journal box and a brake-beam supporting-member extending therefrom rigidly and having elements bearing firmly on the walls of the box, the supporting-member having a guide along which the beam may travel and terminating slightly beyond the guide, said guide inclined downwardly in relation to the adjacent side of the box.

8. In a railway car truck, the combination of a wheel-and-axle assembly, an axle journal-box, a brake-beam supporting-member having means surrounding the axle and rigidly mounted on the box for stabilizing such member immovably with respect to the wheel axis, and a beam-guide on such member extending at an inclination to the horizontal plane of the wheel axis.

9. In a railway car truck, the combination of a wheel-and-axle assembly, an axle journal box, a member rigid with and extending from the box, alongside of the wheel, said member having a closed loop surrounding and firmly bearing on the walls of the box and said member also having a brake-beam guide extending for a length which is at least equivalent to the extent of travel of the beam during application and release of the brake, and said guide inclined downwardly with respect to the box and in fixed position relatively to said loop and the wheel axis, and a brake beam having an end-portion received and guided by said guide, whereby the beam is guided in an inclined plane which is substantially unvarying upwardly or downwardly in relation to the wheel axis.

10. A supporting unit for two brake beams, including beam-supporting members and structure intermediate of said members and rigid therewith, and adapted to stably support the unit on a truck journal box, said members having their beam supports below the central horizontal plane of such structure.

11. A supporting unit for two brake beams, including beam-supporting members and structure intermediate of said members adapted to stably support the unit on a truck journal box, such structure having a box-receiving opening, the surrounding walls of which may have a snug fit on the box.

12. A supporting unit for two brake beams, including beam-supporting members having beam guides in which the ends of the beams may travel during brake operation, and structure intermediate of said members adapted to stably support the unit on a truck journal box; said guides extending outwardly away from such structure and inclined downwardly therefrom.

13. A supporting unit for two brake beams, including beam-supporting members having beam guides in which the ends of the beams may travel during brake operation, and a rectangular open structure intermediate of said members adapted to stably support the unit on a truck journal box, upon which it is adapted to snugly fit, said guides extending outwardly away from such structure and inclined downwardly therefrom.

14. A supporting unit for two brake beams, including beam-supporting members having beam guides in which the ends of the beams may travel during brake operation, and a rectangular open structure intermediate of said members adapted to stably support the unit on a truck journal box, upon which it is adapted to snugly fit, said guides extending outwardly away from such structure and inclined downwardly therefrom, and the planes in which the guides extend intersecting substantially at the center of the opening in said structure.

15. A supporting unit for two brake beams, including beam-supporting members having beam guides in which the ends of the beams may travel during brake operation, and a rectangular open structure intermediate of said members adapted to stably support the unit on a truck journal box, upon which it is adapted to snugly fit, said guides extending outwardly away from such structure and inclined downwardly therefrom, and the planes in which the guides extend intersecting substantially at the center of the opening in said structure, which planes are at an angle of substantially twelve to fourteen degrees to horizontal.

16. Brake-supporting means for a railway car truck, comprising a journal box and brake-beam supporting-members rigid thereon and extending as two such members in opposite directions from the box, the beam supports of such members being below the central horizontal plane of the box.

17. Brake-supporting means for a railway car truck, comprising a journal box, a loop structure surrounding and rigid with the box, and brake-beam supporting-members rigid with the structure and extending in opposite directions from the box and such structure.

18. Brake-supporting means for a railway car truck, comprising a journal box and brake-beam supporting-members rigid thereon and extending in opposite directions from the box, and each of the members having, in spacial relation to the corresponding side of the box, a brake-beam guide along which the beam may travel, said guides inclined downwardly away from their ends nearest the box.

19. Brake-supporting means for a railway car truck, comprising a journal box and brake-beam supporting-members rigid thereon and extending in opposite directions from the box, and each of the members having, in spacial relation to the corresponding side of the box, a brake-beam guide along which the beam may travel, said guides inclined downwardly away from their ends nearest the box, and extending in planes which intersect at a point in the box substantially coinciding with the axis of the adjacent wheel.

20. In a railway car truck, the combination of a wheel-and-axle assembly, a journal box in which the axle is mounted, beam-supporting members rigid with the box and extending in opposite directions from the box, and a brake-beam guide on each such member and along which the beam may operate, said guides inclined downwardly from the ends nearest the box, whereby the guides, box and assembly have a definite relation to each other.

21. In a railway car truck, the combination of a wheel-and-axle assembly, a journal box in which the axle is mounted, beam-supporting members rigid with the box and extending in opposite directions from the box, and a brake-beam guide on each such member and along which the beam may operate, said guides inclined downwardly from the ends nearest the box, whereby the guides, box and assembly have a definite relation to each other, the planes in which the guides extend intersecting at a point substantially coinciding with the axis of the wheel, and brake beams, each guided by one of the guides, and adapted to be operated in such intersecting planes.

22. Brake-supporting means for a railway car truck, comprising a journal box, a unitary structure having its intermediate portion rigid with the box, and brake-beam supporting-members on the said portion and extending in opposite directions from the same, and each of the members having, in spacial relation to the corresponding side of the box, a brake-beam guide along which the beam may travel, said guides inclined downwardly away from their ends nearest the box.

23. Brake-supporting means for a railway car truck, comprising a journal box, a unitary structure having its intermediate portion rigid with the box, and brake-beam supporting-members on the said portion and extending in opposite directions from the box, and each of the members having, in spacial relation to the corresponding side of the box, a brake-beam guide along which the beam may travel, said guides inclined downwardly away from their ends nearest the box and extending in planes which intersect at a point in the box substantially coinciding with the axis of the adjacent wheel.

24. In a railway car truck, the combination of a wheel-an-axle assembly, a journal box in which the axle is mounted, a unitary structure having beam-supporting members extending in opposite directions, said structure rigid with the box, and a brake-beam guide on each such member and along which the beam may operate, said guides inclined downwardly from the ends nearest the box; the guides, structure, box and assembly having a definite fixed relation to each other.

25. In a railway car truck, the combination of a wheel-an-axle assembly, a journal box in which the axle is mounted, a unitary structure having beam-supporting members extending in opposite directions, said structure rigid with the box, and a brake-beam guide on each such member and along which the beam may operate, said guides inclined downwardly from the ends nearest the box, the guides, structure, box and assembly having a definite fixed relation to each other, the planes in which the guides extend intersecting at a point substantially coinciding with the axis of the wheel.

26. In a railway car truck, the combination of a wheel-and-axle assembly, a journal box in which the axle is mounted, a unitary structure having beam-supporting members extending in opposite directions, said structure rigid with the box, and a brake-beam guide on each such member and along which the beam may operate, said guides inclined downwardly from the ends nearest the box; the guides, box and assembly having a definite fixed relation to each other, the planes in which the guides extend intersecting at a point substantially coinciding with the axis of the wheel, and brake beams, each guided by one of the guides, and adapted to be operated in such intersecting planes.

27. In a railway car truck, a journal box, a side member having two guide-ways and rigid with the box, a load-supporting member, a wheel-and-axle assembly, means supporting the load-supporting member independently of the guides, a clasp brake including brake beams supported by such guide-ways on opposite sides of such assembly, said guide-ways arranged at opposite sides of the wheel and being oppositely inclined relative to the length of said truck, and means preventing disengagement of the beams from said guide-ways in case the beams become disconnected from the brake rigging.

28. In a railway car truck, the combination of a unitary structure for supporting clasp-brake mechanism, a journal box on which the structure is rigidly mounted, two brake beams, and two guides on such structure and located beyond opposite sides of the box for supporting and guiding the beams, such guides being oppositely inclined with respect to the adjacent car wheel axis, and stop means at the lower end of each guide for confining each beam, and movable to release the two beams.

CHARLES R. BUSCH.